United States Patent
McGuinness et al.

(10) Patent No.: US 12,141,859 B2
(45) Date of Patent: Nov. 12, 2024

(54) IMAGE CROPPING METHOD AND SYSTEM

(71) Applicant: TERRY'S TEXTILES LTD, Newcastle-under-Lyme (GB)

(72) Inventors: Paul McGuinness, Newcastle-under-Lyme (GB); Ashley Salt, Stoke-on-Trent (GB); Grzegorz Górnisiewicz, Brzostek (PL)

(*) Notice: Subject to any disclaimer, the term of this patent is extended or adjusted under 35 U.S.C. 154(b) by 397 days.

(21) Appl. No.: 17/622,009

(22) PCT Filed: Jun. 24, 2020

(86) PCT No.: PCT/EP2020/067730
§ 371 (c)(1),
(2) Date: Dec. 22, 2021

(87) PCT Pub. No.: WO2020/260405
PCT Pub. Date: Dec. 30, 2020

(65) Prior Publication Data
US 2022/0245715 A1    Aug. 4, 2022

(30) Foreign Application Priority Data
Jun. 24, 2019 (GB) .................. 1909022

(51) Int. Cl.
G06T 19/00     (2011.01)
G06Q 30/0601   (2023.01)
G06T 3/40      (2006.01)
G06T 7/11      (2017.01)

(52) U.S. Cl.
CPC .......... *G06Q 30/0643* (2013.01); *G06T 3/40* (2013.01); *G06T 7/11* (2017.01); *G06T 19/006* (2013.01); *G06T 2207/20132* (2013.01)

(58) Field of Classification Search
None
See application file for complete search history.

(56) References Cited

U.S. PATENT DOCUMENTS

2005/0007382 A1   1/2005  Schowtka
2014/0168262 A1   6/2014  Forutanpour

OTHER PUBLICATIONS

International Search Report & Written Opinion mailed Sep. 8, 2020, in international patent application No. PCT/EP2020/067730, 14 pages.
Unknown, "Sketching up the world: In situ authoring for mobile Augmented Reality", Jan. 12, 2011 (Jan. 12, 2011), p. 1, Retrieved from the Internet: URL:http://www.youtube.com/watch?v=TjUwRIRzCus XP002677260.
International Search Report and Written Opinion for PCT/EP2020/067730 mailed Nov. 9, 2020, 14 pages.

(Continued)

Primary Examiner — Robert J Craddock
(74) Attorney, Agent, or Firm — Blueshift IP, LLC; Cynthia M. Gilbert

(57) ABSTRACT

A method of overlaying two images, comprising retrieving an image of a first object; generating an image mask; receiving an input to position the image mask over the image of the first object; receiving a first dimension of the first object; receiving a selection of characteristics of a second object; receiving an image of the second object having the selected characteristics, wherein the received image has been cropped according to the first dimension of the first object; and overlaying the cropped image of the second object on the image of first object at the position of the image mask.

16 Claims, 8 Drawing Sheets

(56) References Cited

OTHER PUBLICATIONS

Unknown, "Sketching up the world: In situ authoring for mobile Augmented Reality", Jan. 12, 2011 (Jan. 12, 2011), p. 1, Retrieved from the Internet: URL: http://www.youtube.com/watch?v=TjUwRIRzCusXP002677260 [retrieved on Jun. 6, 2012].

IMAGE CROPPING METHOD AND SYSTEM

FIELD OF THE INVENTION

The present invention relates to a process and apparatus for cropping an image, and more particularly to the cropping of an image in order to accurately represent an object in a physical space.

BACKGROUND TO THE INVENTION

Testing the suitability of a physical item in or at a specific location requires physically moving the item to a particular location and may also require the adjustment or modification of existing objects to accommodate the item—for example, by securing or fixing the item to an existing object. Although an item may appear to be suitable for placement in a particular room, setting, or environment, it may transpire that the item is actually unsuitable once it has been physically moved to the desired location. Due to the need to physically move/transport the item and make necessary adjustments to accommodate it, testing the suitability of multiple different types of the item (for example) is inconvenient, time consuming and, in most cases, expensive.

The accurate, virtual representation of a physical object or item in a specific environment can avoid the need to physically move the object/item in order to test its suitability. Various known applications provide the ability to 'preview' or visualise how an object will look in a particular (real-world) environment. Some applications exist which allow a user to view, using the camera facility on a user device, images of products overlaid in the camera feed. Such applications may utilise augmented reality frameworks, such as ARCore from Google, Inc, for the Android operating system and ARKit from Apple, Inc. for the iOS operating system. As an example, ARKit allows a user to 'scan' an environment, such as rooms in a house, with a camera facility on a user device such as a phone or tablet and then calculates the dimensions of the rooms and/or objects in the room. This information may be used to order appropriate quantities of building or decorating materials, create a floor plan or simply determine whether a piece of furniture will fit within a specific area or space, amongst other uses. Other systems facilitate the placement of an image of a product (e.g. an artwork) within a still image. These applications mean that the physical transportation of an object is required only once, as the requirement to physically test the suitability of the object is avoided by the simulation provided.

Existing systems, however, are generally for the representation and visualisation of 'off-the-shelf' products—i.e. products having known dimensions, rather than products that are bespoke for each user and environment. For bespoke objects, which are tailored for a specific or unique application or size, the need to source the object and physically move it to the desired location, and further make any adjustments as necessary to the surrounding environment, still exists, since known applications facilitate only the visualisation of objects/items having predefined dimensions (or indeed other characteristics). It is an object of the present invention to address, or at least mitigate, deficiencies of the prior art.

SUMMARY OF THE INVENTION

According to a first aspect of the invention, there is provided a method of simulating a product in a 3D environment, comprising the steps: determining the dimensions of an object, wherein the dimensions define an image container or mask; receiving a product image, wherein the product image is an image of a product having predetermined dimensions; determining a cropped width and/or height of the product image based on dimensions of the image container; modifying the product image according to the determined cropped width and/or cropped height; and inserting the modified product image into the image container.

The present invention provides for the generation of an image of an object or product, preferably in 3 dimensions, that has been created specifically according to the size of an individual physical object.

Preferably, the method further comprises displaying the image mask in a view of the 3D environment at the location of the object.

Preferably, the image container is deformed to create a 3D model. Further preferably, the image container is deformed so as to simulate the variation in depth of the specific object or product. Advantageously, the 3D model is therefore custom-generated according to the specific size of a physical object and the shape of a specific object or product.

Further preferably, the cropped width and height have UV values in UV space. Optionally, the cropped height of the product image is less than the height of the image container.

Preferably, the step of cropping further comprises aligning the centre of the cropped width of the cropped product image with the centre of the product image so that the centre width value of the product image is aligned with the centre width value of the cropped product image.

The method may further comprise the steps of generating a 2D mesh using the image container; and deforming the 2D mesh. Optionally, the method further comprises receiving a selection of a type of product, and deforming the mesh according to the type of product. Preferably, the 2D mesh comprises a number of grid points, and the number of grid points may be dependent upon the type of product.

The step of deforming the 2D mesh may comprise moving the grid points in a direction perpendicular to the plane of the 2D mesh.

Preferably, the method further comprising the step of assigning each grid point a UV coordinate, wherein the UV coordinates are determined based on the cropped width value (U), and/or height value (V) of the product image, the horizontal offset and the number of columns and rows in the 2D grid.

Optionally, augmented reality functionality may be utilised to identify vertical planes in a 3D environment viewed through a camera feed of the device. Optionally, comprising augmented reality functionality may be utilised to identify features of the 3D environment, preferably wherein the features are windows and doors.

Optionally, the method comprises receiving user input specifying the object in the 3D environment, and may further comprise receiving user input of the dimensions of the object in the 3D environment.

According to a further aspect of the invention, there is provided a method of simulating an object in a 3D environment, comprising the steps: determining the dimensions of a first object, wherein the first object is present in the 3D environment, generating an image container or mask based on the determined dimensions of the first object; receiving an image of a second object, wherein the image of the second object is an image of an object having predetermined dimensions; determining a modified width and/or height of the image of the second object based on dimensions of the image container; modifying the image of the second object according to the determined modified width and/or height.

Preferably, the method further includes inserting the modified image of the second object into the image container and further preferably displaying the image mask in a view of the 3D environment at the location of the first object.

According to a further aspect of the invention, there is provided a system for overlaying two images, wherein the system comprising a user device and an external computing system, wherein the user device is configured to: retrieve an image of a first object, receive an input to position an image mask over the first object in the image; receive a first dimension of a desired second object and desired type of second object and send the received dimensions and type of second object to the external computing system; wherein the external computing system is configured to: store images of multiple types of second object; identify one or more images of types of second object based on the desired type of second object received from the user device; crop the one or more images of the second object based on the received first dimension from the user device; and send, to the user device, the cropped image, and wherein the user device is further configured to overlay the cropped image on the image of the first object at the position of the image mask. The external computing device may send instructions to the user device to replace the image mask with the cropped image. The system facilitates the visualisation of a bespoke product in a unique setting/environment, thereby avoiding the need to physically place the object in the environment.

Preferably, the images of multiple types of second object stored at the server images have a predetermined width, length and aspect ratio. The user device may be configured to display a placeholder image prior to receiving the cropped image. The external computing device is preferably configured to crop the selected image of the second object according to the width of the first dimension of the first object by subtracting the received width from a predetermined value and dividing the result by two to result in a cropping value, and cropping each side of the image of the selected second object by the cropping value.

The user device may be configured to scale the cropped image such that the width of the cropped image extends across the width of the image mask, and may also be configured to crop the length of the received cropped image to fit the length of the image mask. The user device may be configured to crop the length of the received cropped image so that the length of the cropped image, when overlaid on the image of the first object, is less than the length of the image mask.

According to a further aspect of the invention, there is provided a method of cropping an image, comprising receiving a value of width of a first object; receiving a selection of characteristics of a second object; selecting, from multiple images of a second object, an image of a second object according to the received selection of characteristics; cropping the selected image of the second object according to the received value of a width of the first object by subtracting the received width value from a predetermined value and dividing the result by two to result in a cropping value, and cropping each side of the image of the second object by the cropping value, wherein the cropped image represents a physical object placed at or near the location of the first object. The method therefore generates an image of an object which has been tailored for suitability in a particular environment, setting, or for compatibility with an existing object in a particular environment or setting. The generated image of the tailored object can then be used in conjunction with an image of the relevant setting or environment to allow visualisation of the bespoke product in the relevant setting or environment without physically placing the object in the relevant setting or environment.

According to a further aspect of the invention, there is provided a method of representing an object in an environment, comprising retrieving an image of a first object; generating an image mask; receiving an input to position the image mask over the image of the first object; receiving a first dimension of the first object; receiving a selection of characteristics of a second object; receiving an image of the second object having the selected characteristics, wherein the received image has been cropped according to the first dimension of the first object; and overlaying the cropped image of the second object on the image of first object at the position of the image mask. The method therefore facilitates the creation of a composite image which is a digital representation or visualization of a bespoke object in relation to another object.

The first dimension is preferably width. The method may further comprise cropping the length of the cropped image to fit the length of the image mask, or cropping the length of the cropped image so that the length of the cropped image is less than the length of the image mask. Preferably, the step of overlaying comprising scaling the cropped image such that the cropped image extends across the width of the image mask. The first object may be a window or door, and the second object may be a blind. The method may further comprise receiving instructions that the second object is approved and presenting purchase options on the user device. The step of retrieving an image of a first object may comprise outputting, to a display of the user device, a prompt to take a photograph of the first object or to select an existing photograph of the first object.

According to a further aspect of the invention, there is provided a system for overlaying two images, comprising a user device and an external computing system, wherein the user device is configured to: determine dimensions of a first physical object; generate an image mask representing the position of the first physical object; receive a desired type of second object, and send the determined dimensions of the first physical object and type of second object to the external computing system; and wherein the server is configured to store multiple images of different types of second object; select one or more images of a second object according to the received type of second object from the user device; crop the image of the second object based on the received dimensions from the user device; and send, to the user device, the cropped image, and wherein the user device is further configured to overlay the cropped on the image of the first object at the position of the image mask on a display of the user device.

Preferably, the multiple images of types of second object stored at the external computing system have a predetermined width, length and aspect ratio. Optionally, the external computing device is configured to crop the selected image of the second object according to the width of the first dimension of the first object by subtracting the received width from a predetermined value and dividing the result by two to result in a cropping value, and cropping each side of the image of the selected second object by the cropping value. The user device is preferably configured to scale the cropped image such that the width of the cropped image extends across the width of the image mask.

The user device may crop the length of the received cropped image to fit the length of the image mask, or may crop the length of the received cropped image so that the length of the cropped image, when overlaid on the image of the first object, is less than the length of the image mask.

According to a further aspect of the invention, there is provided a method of cropping an image, comprising receiving a first dimension of a physical object; receiving a selection of characteristics of a second object; selecting an image of a type of second object based on the received selection of characteristics; cropping the selected image of the second object according to the width of the first dimension of the first object by subtracting the received width from a predetermined value and dividing the result by two to result in a cropping value and cropping each side of the image of the second object by the cropping value; and sending the cropped image of the second object to a user device, wherein the cropped image represents a physical object.

According to a further aspect of the invention, there is provided a method of displaying an image, comprising displaying an image mask on a display of user device at the location of a first object as viewed through a camera feed of the user device, determining a first dimension of the first object; receiving a selection of characteristics of a second object; receiving an image of a second object having the selected characteristics, wherein the received image has been cropped according to the input of the first dimension of the first object; and overlaying the cropped image of the second object at the position of the image mask.

The first object is preferably a window or door and the second object is preferably a blind. The cropped image may represent a physical object placed at the location of the first object. Preferably, the method comprises scaling the cropped image such that the width of the cropped image extends across the width of the image mask. The length of the received cropped image is preferably cropped to fit the length of the image mask. Alternatively, the length of the received cropped image is cropped so that the length of the cropped image, when overlaid on the image of the first object, is less than the length of the image mask.

DETAILED DESCRIPTION

An overview of the method according to an embodiment of the invention will be described with reference to the Figures.

Figure 1:
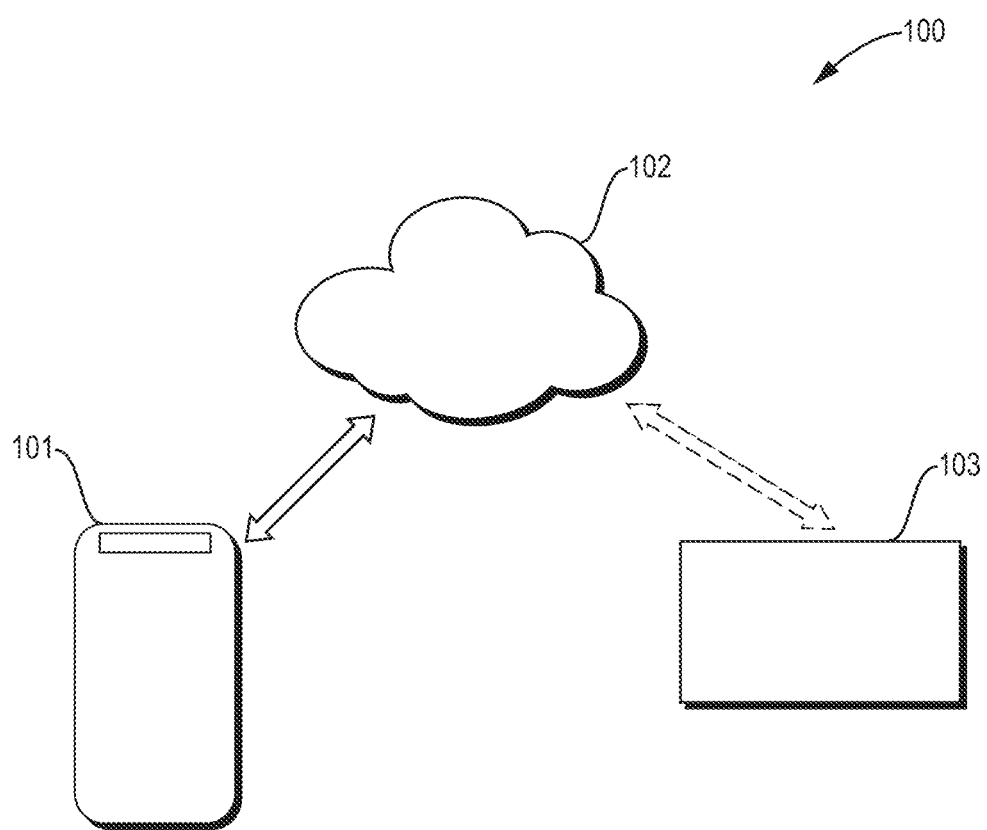
FIG. 1 is a schematic diagram illustrating the main components of the system for performing an image cropping method.

In a preferred embodiment, a user device has an installed user application which executes the method in conjunction with a server. In an alternative embodiment, the process can be executed by a website. The main system components are shown in FIG. 1. An application on user device 101 is in communication with an external computing platform, preferably cloud server 102. Cloud server 103 may also be in communication with client system 103 which is able to configure the external computing platform according to individual client requirements.

In an embodiment, the user opens the application on a user device, which may be a smartphone or tablet computer, for example, comprising a display, processing units, and wireless communication means. The application invites the user to select a product type from at least two different product types that they are interested in and therefore wish to view.

Figure 2:
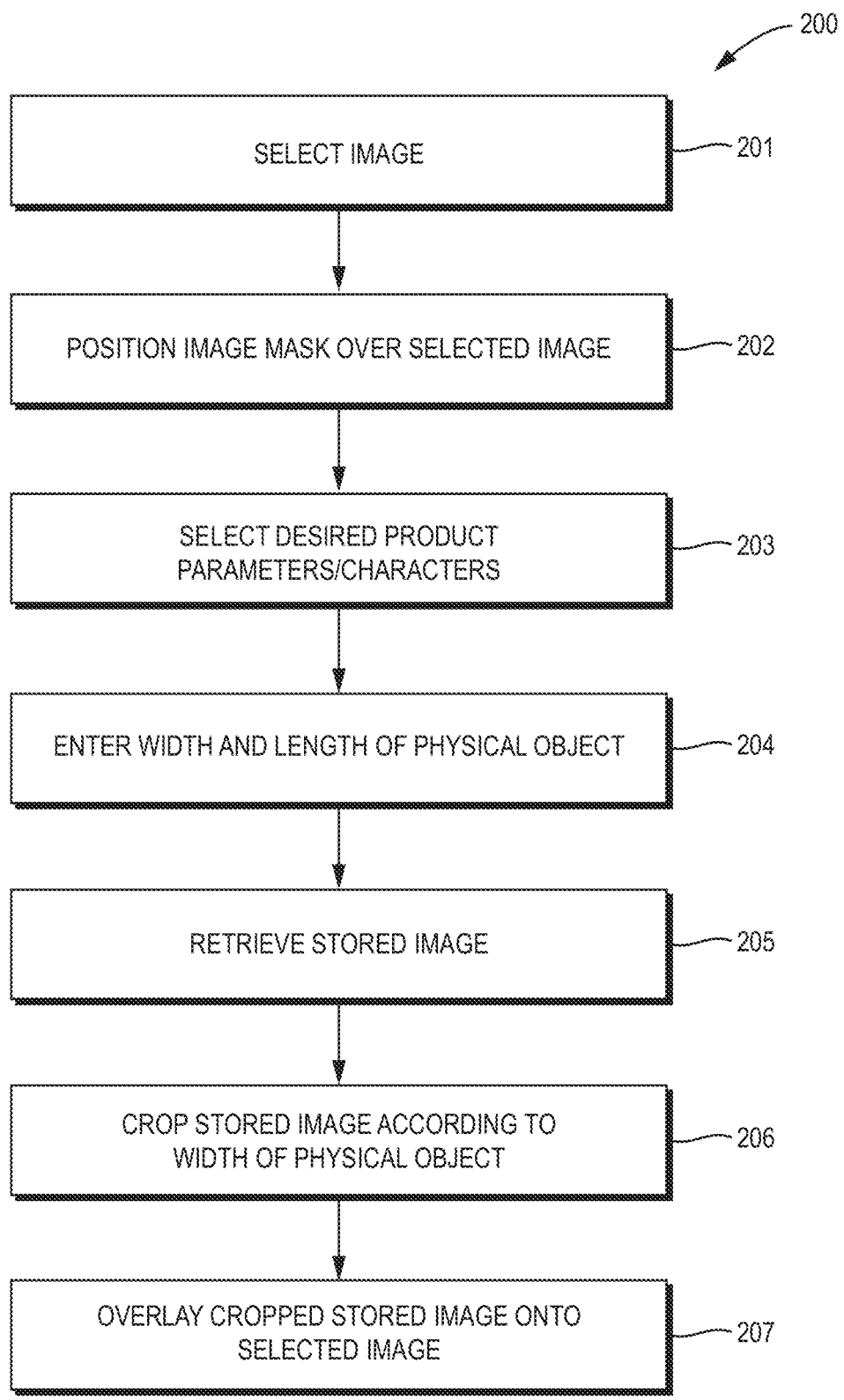
FIG. 2 is a flow diagram showing the main steps of an image cropping method according to an embodiment of the invention.

With reference to process 200 of FIG. 2, the application, at step 201, invites the user to either select an image/photograph of a real-world environment, such as a photo of a location in a building, from existing images accessible by the user device, or to take a new image with the user device. An image to be selected by the user preferably comprises a view of an item or object to which the selected product type is to be applied. The item or object may be a door or window and the product types may include a roller blind and a roman blind.

Figure 3A:
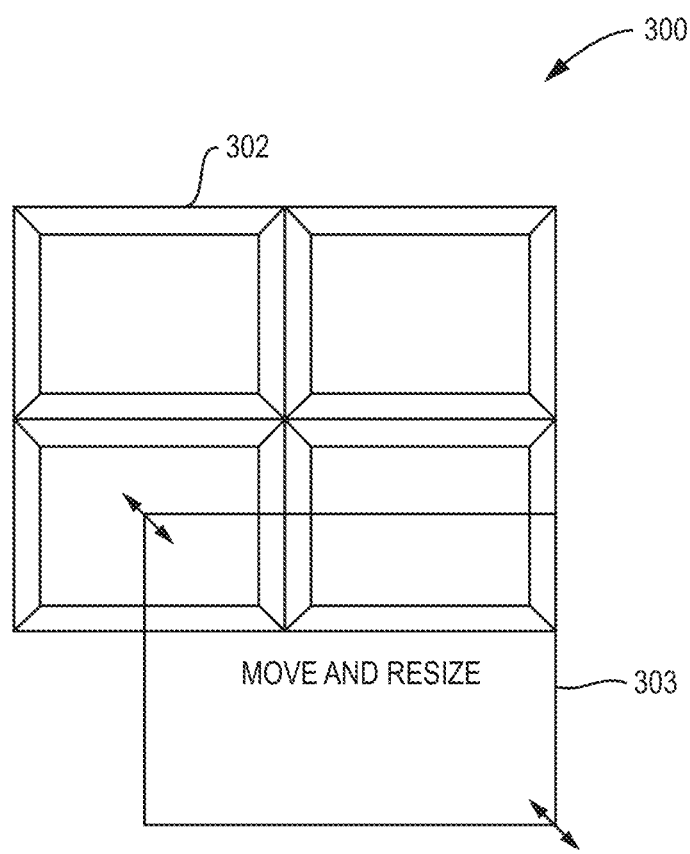
FIG. 3a is a representation of a user image and image mask according to an embodiment of the invention.
Figure 3B:
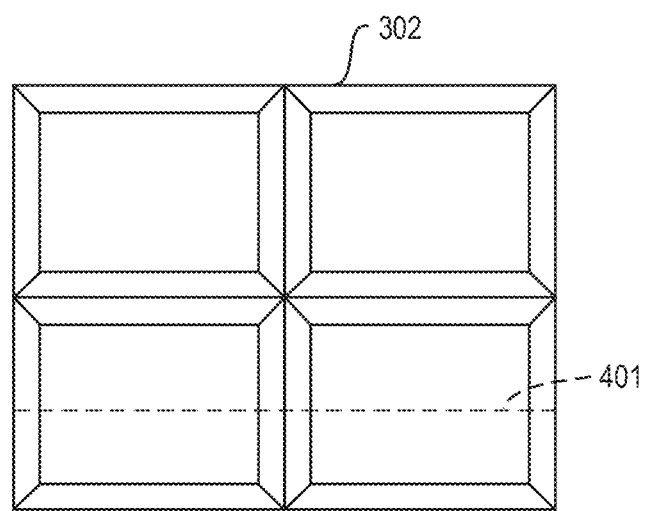
FIG. 3b is a further representation of a user image and image mask according to an embodiment of the invention.

Once an image is selected, the application positions an image mask within the selected image at step 202. The image mask is presented as a semi-opaque 2 dimensional shape, overlaid on the user image, and the user is able to move and resize the image mask so that it preferably completely and accurately covers the physical object in the photograph. FIG. 3 shows image 300 which comprises item/object 302, which in FIG. 3 is a window. Image mask 303 is displayed and the user is able to move and resize the image mask (using user interface gestures and techniques known in the art) so that is covers window 302, similarly to how a blind would cover the window.

At step 203 of FIG. 2, the user is invited to select characteristics, such as styles, pattern and colour, of the chosen product type. In a preferred embodiment, the user is required to select a colour and then select a pattern. The user is typically able to select a pattern by scrolling through multiple possible patterns, and similarly choose a colour by scrolling through multiple different colours. The number of patterns to select from may be dependent upon the product type chosen and the colour. It will be appreciated that the particular characteristics and number of different characteristics available for selection by a user may be dependent upon the specific application and product. In some embodiments, the user can make multiple selections.

At step 204, the user is invited to enter the width of the product required. In an alternative embodiment, the user is required to enter both width and length of the product required. As will be appreciated, products such as blinds are supplied to specific dimensions to match the dimensions of specific windows and doors, for which there are no standardised dimensions. Accordingly, the user is invited to enter the specific dimensions of the blind needed to match the window or door for which the blind is required. The one or more dimensions required from the user may be dependent upon the specific application. Products are typically available having dimensions within a particular range. Accordingly, the application sets a maximum (and preferably also a minimum) width and length that can be entered by the user. As a specific example, the maximum possible width of some blinds is 198 cm. The maximum length is typically set to encompass all likely lengths of windows and doors. As a specific example, the maximum length is set at 300 cm.

An external computing system stores (or has access to storage of) images of multiple different types and variations of a product, where each image is a representation of a different product having different characteristics (e.g. fabrics, colours, images and patterns etc.). The product size represented by each image is predefined. In a specific example, each image is of a product having a width of 198 cm. Thus, the images stored are images of the product having a maximum width available. The images are preferably stored in .PNG format.

At step 205, one or more images of a product having the one or more characteristics as specified by the user are determined based on metadata for each product image.

An image which is determined to have the characteristics specified by the user is cropped at step 206. To do this, the width of the product that has been entered by the user is subtracted from the maximum width of the product (and for which an image is stored). The result of the subtraction is the amount is to be cropped from the product image. So as to maintain an even pattern repeat, the amount that needs to be cropped from the image is divided by two and the result of this is the amount that is cropped from the side (left and right) edges of the stored image. If the image was not cropped according to the actual width of the window/door (i.e. the stored image of a 198 cm width blind was simply inserted into the image mask), the resulting image displayed to the user would not be representative of how the blind would actually appear in the window/door, because the characteristics of the blind (e.g. pattern) would be scaled, which does not occur when a blind is actually prepared for a particular door/window. It will be appreciated that, for products having patterns or images, the patterns and images have an aspect ratio. For accurate representation of the product, it is important that the aspect ratio is maintained. Step 206 may occur either at the server or at the user device.

Figure 4:
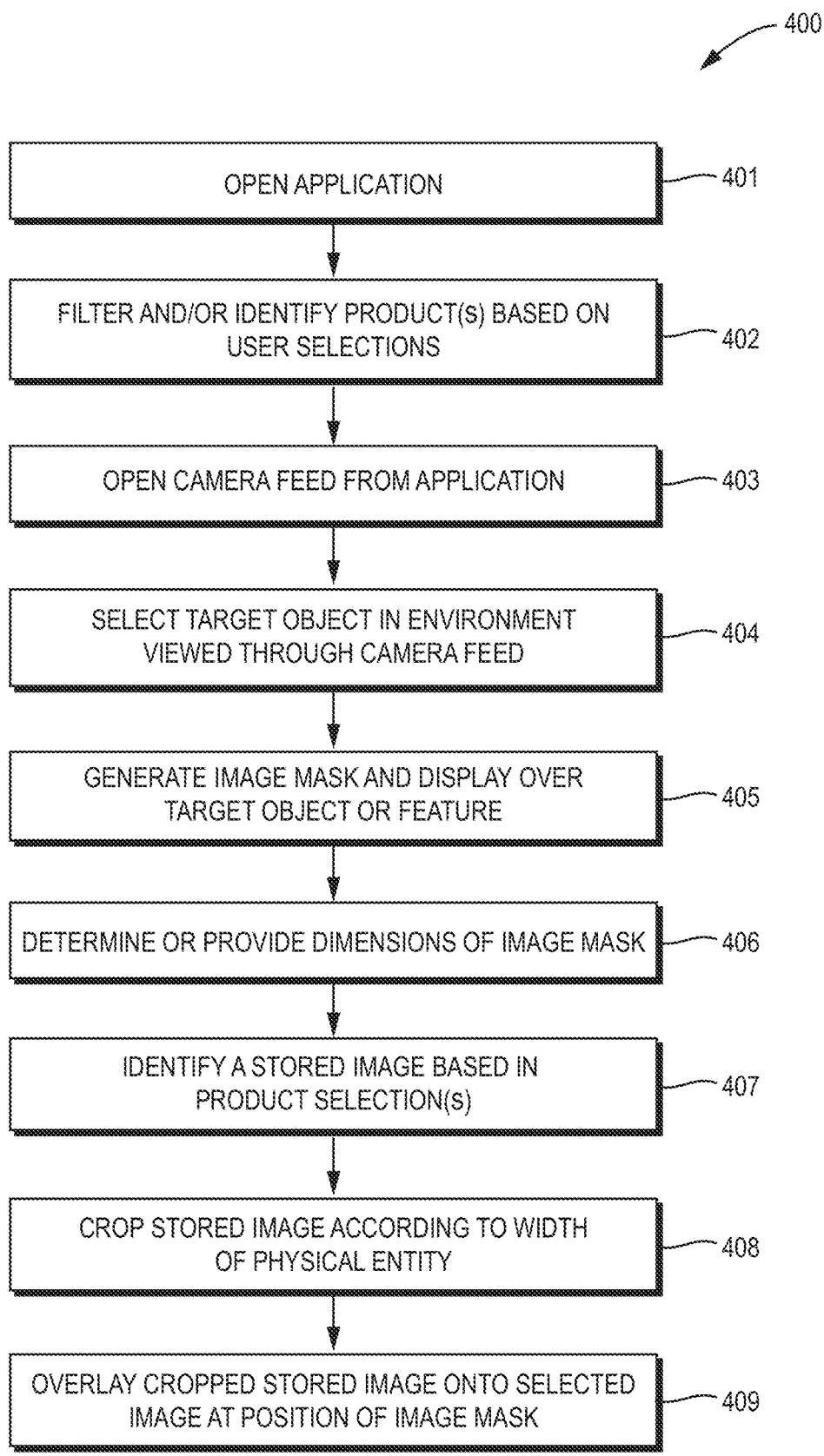
FIG. 4 is a flow diagram showing the main steps of an image cropping method according to an embodiment of the invention.

The length of the stored image is cropped according to the length of the image mask. Alternatively, the length of the image is cropped by a greater amount than would be necessary to fit the length of the image mask such that the blind in the resulting image appears to be partially open. The result of the cropping according to this alternative embodiment is shown by dotted line 401 in FIG. 4. FIG. 4 shows the image mask covering the entire area defined by window 302. In an alternative embodiment, the length of the image is cropped significantly such that the blind appears to be up/open. The server may provide multiple 'views' of a specific blind—i.e. up/open, completely closed (i.e. completely filling the image mask) or partially open (as per dotted line 400). For multiple 'views', the application may output a prompt for the user to select which of 'view' is shown/viewable.

At step 207, the cropped image is sent to the user application (if the product image is cropped at the server) and is overlaid on the user image at the position of the image mask. The cropped image may require scaling such that the width of the cropped image equals the width of the image mask. If the user has made multiple selections for characteristics and/or if multiple images of products are stored which meet the user's selections, multiple images may be sent to the user application. In one embodiment, at least a portion of the window or door is visible due to the image of the blind, as sent from the server, extending only as far as dotted line 401 (as a result of excess length cropping). The user is therefore able to see, on their image, a blind in the window or door, as it would appear in the physical environment. Steps 203 and 204 may occur before prior to steps 201 and 202. Indeed, the ordering of the steps in FIGS. 2 and 5 may be changed according to specific requirements.

In an alternative embodiment, the resulting cropped and scaled image is overlaid on a camera feed, such that a user is able to view, on the display of their user device, the item within their home (e.g. a representation of a blind as it would appear when fixed to a door or window, for example) as they move their user device around and view the camera feed on the display. In this embodiment, an image mask is moved and resized in a similar way as described above but in a video/camera feed rather than a still image. Alternatively, the user application utilises augmented reality functionality, to identify and/or measure a window or door. For example, the AR framework available for iOS facilitates the measurement of objects by firstly determining a frame of reference, and then automatically identifying rectangles (or allowing a user to specify a shape/object). For automatic shape identification, a measurement box is overlaid onto the camera feed, and the measurements of the identified rectangle are determined. In an embodiment, a user application uses the measurement box as the image mask (or to generate the image mask), and the user is not required to enter the width and length of the window or door.

An embodiment in which an augmented reality framework is utilised is described in further detail with reference to FIG. 4. At step 401, a user opens the application on their device. Optionally, the user is invited to filter products and/or make one or more product selections at step 402. Step 402 may alternatively occur after step 406. At step 403, upon an appropriate user interface gesture from the user, the application accesses the device's camera feed, which is displayed on the screen of the user device. AR capabilities of the user device's operating system are able to identify features and characteristics of the environment viewed through the camera feed, such as structural features (walls, doors, windows etc) and furniture, and is also capable of determining the dimensions of such feature and objects. The application presents the user with a selection of target objects in the environment that the AR capability has identified. This could be highlighting the whole or part of the identified objects or features. Other ways of making identified object and features known to the user may be known in the art. The user then selects the target object at step 404. At step 405, an image mask is generated by the application and associated with the target object, such that the image mask is positioned/overlaid in the camera feed at the location of the target object. As the user moves the device, the size and shape of the image mask (as viewed via the camera feed) adapts so as to continuously cover the target object. The AR framework, having already determined the dimension of the target object, provide such dimensions to the application, which uses the dimension of the image mask as the dimensions of the target object. Optionally, however, the user may adjust the image mask (using user interface gestures and techniques known in the art) such that, for example, it is larger or smaller than the target object.

Figure 5:
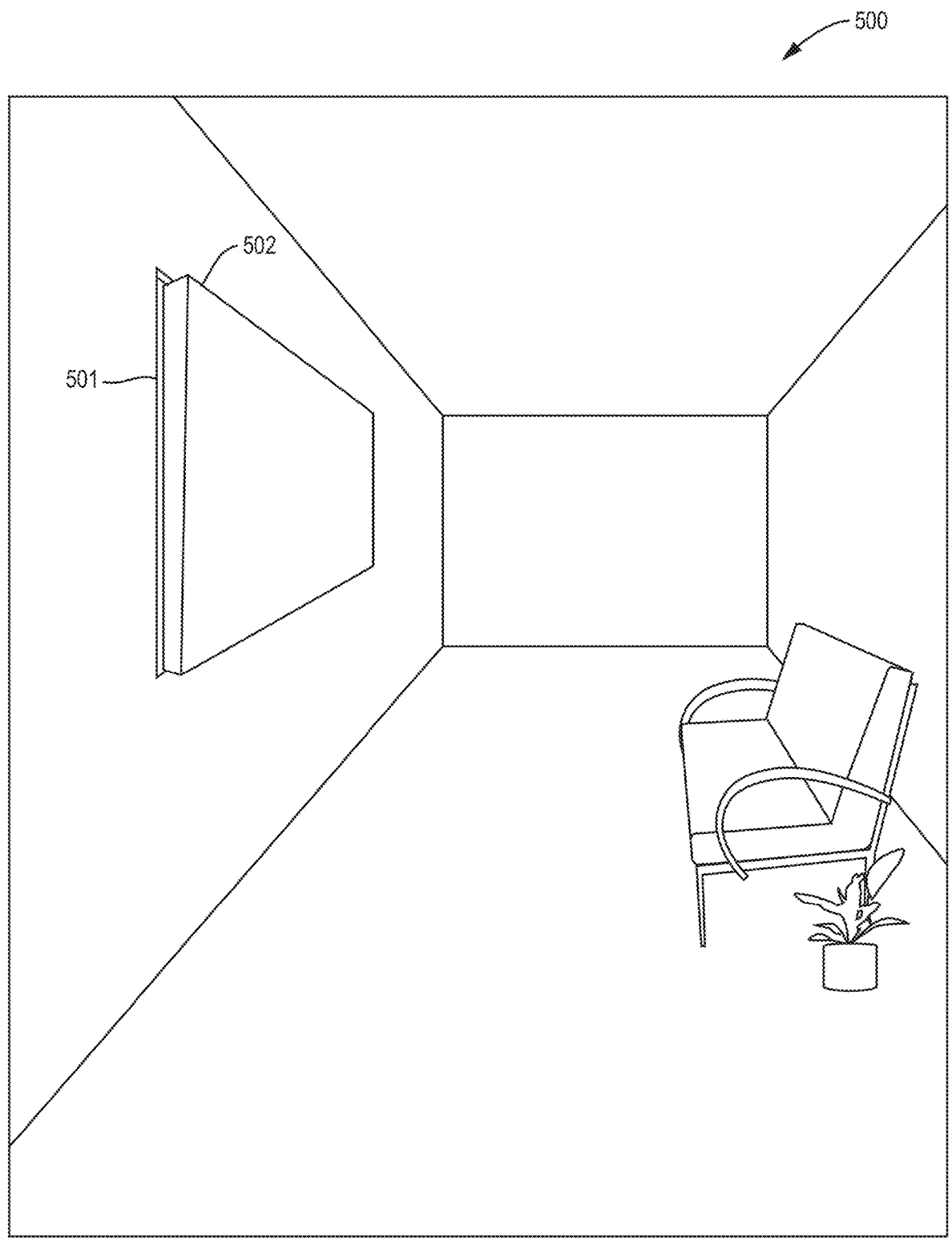
FIG. 5 is an exemplary view from a device's camera feed in which an image mask is positioned over a target object.

FIG. 5 illustrates a room as viewed through the camera feed on a user device, in which window 501 is obscured by image mask 502. In an alternative embodiment, the image mask is 2 dimensional. The location of image mask 502 is automatically determined by the AR framework based on the identification of window 501.

At step 407, the application queries the dataset of product information stored at the server to identify one or more stored images of a product matching the user's product filtering and selection criteria. In an alternative embodiment, step 407 may occur prior to the generation of an image mask and the determination of the image mask's dimensions. The identified stored image is an image of a product which the user desires to view in the environment viewed through the device's camera feed. At step 408, the stored image of the selected product is cropped according to the dimensions of the image mask. As mentioned above, the server stores images of different product having known dimensions, and so, in order to preserve the aspect ratio of products which may comprise graphical features or patterns, the stored image requires cropping so that the image presented to the user is an accurate representation of the product in the user's environment. In one embodiment, the image is cropped at the server and sent to the user's device. In an alternative embodiment, the image is sent to the user's device and is cropped at the user's device.

The images stored at the server may be 2 dimensional or 3 dimensional representations, and the image mask may be 2 dimensional or 3 dimensional. In the embodiment where the stored images and image mask are 2 dimensional, the images are cropped according to the method described above.

At step 409, the cropped image of the product is placed at the location of the image mask. The cropped image is 'tied' to the image mask (which in turn is 'tied' to the target features as identified by the AR framework) such that the image of the product is re-scaled and re-shaped as the user moves the device.

In a yet further embodiment, multiple images of a single product are stored at the server. For example, for each product, 10 images are stored. Each of the 10 images is a different size of the product, for example, 198 cm width, 188 cm width, 178 cm width and so on to 98 cm width. In this embodiment, the dimensions of the image mask are compared with the plurality of different sizes of images of a desired product and the server determines which of the stored images is of a size closest to the width of the image mask. For example, if the width of the image mask is 133 cm, the stored image having a width of 129 cm is selected. The selected image is then sent to the user's device and is inserted at the position of the image mask. Storing multiple images of a single product in this way eliminates the processing requirement for cropping, although requires greater storage capacity at the server.

Figure 6A:
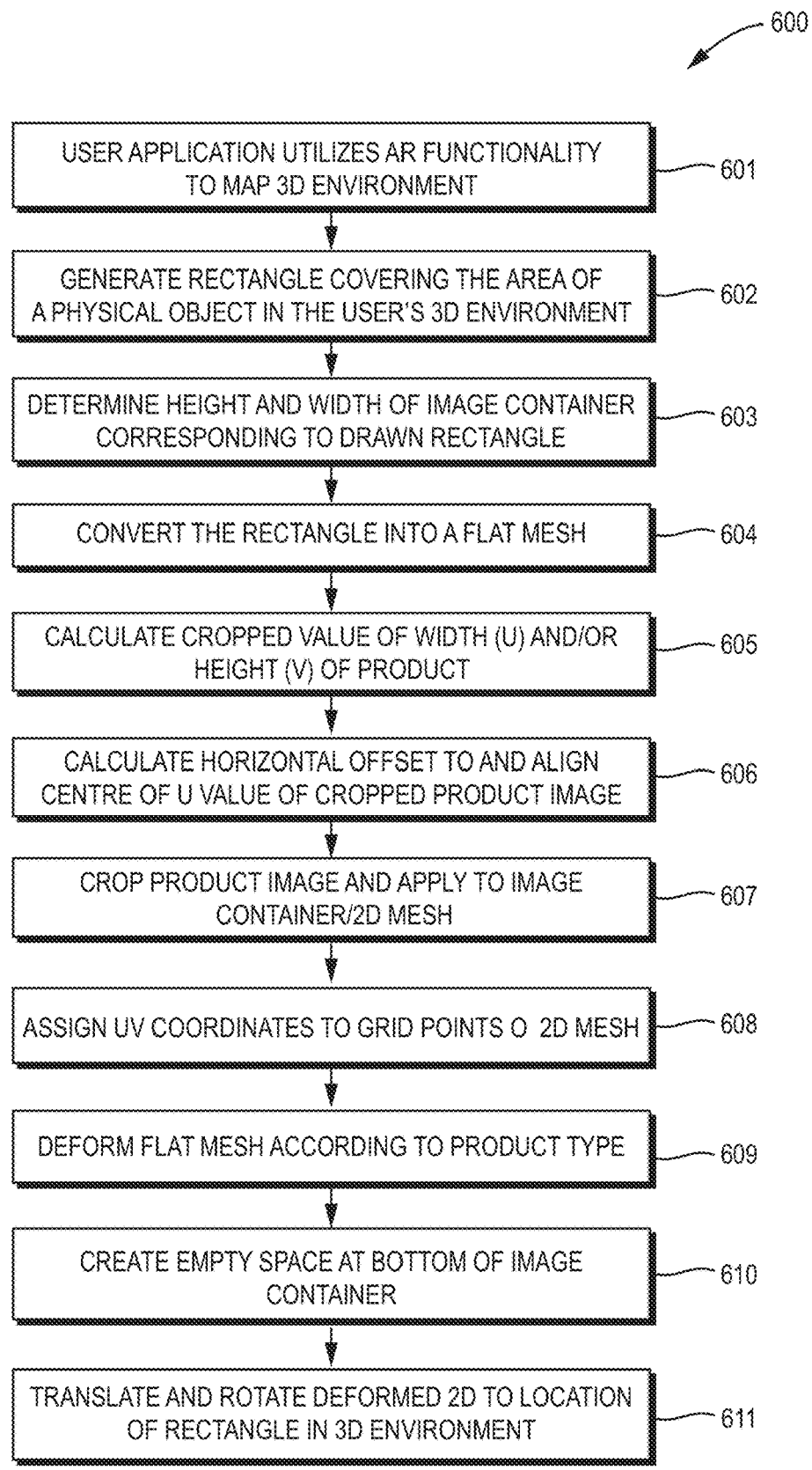
FIG. 6a is a flow diagram showing the main steps of a method of creating an image of a product specific to an object size.
Figure 6B:
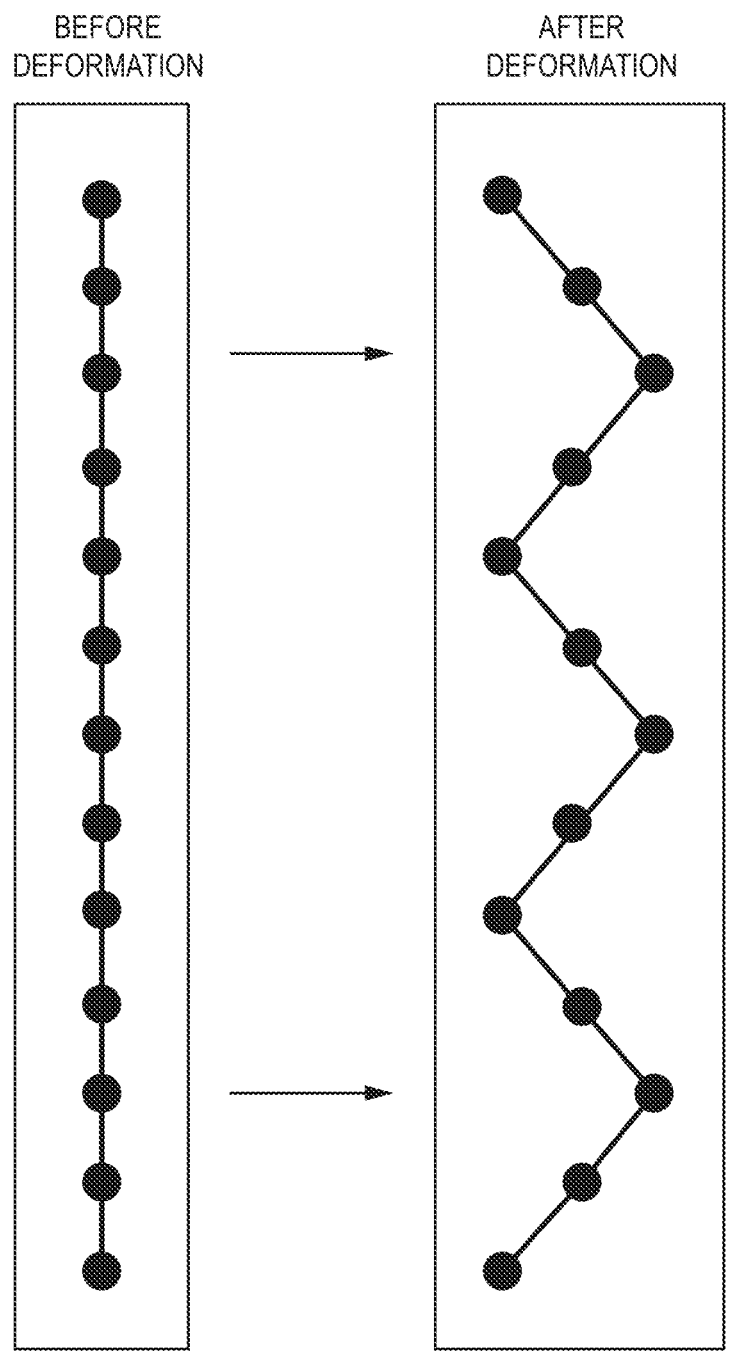
FIG. 6b is a diagram showing an example of deforming a flat mesh.

Generation of a 3D model and textual mapping will be described with reference to FIGS. 6a and 6b. The user application utilises augmented reality features of the device's operating system to map the user's 3D environment. This may be achieved in a number of ways, for example, by detecting vertical planes in the user's environment. The user application may then extend the detected vertical planes such that they cover an entire planar surface—for example, a wall of a room and then prompt the user to indicate the area of a portion of the viewed 3D environment (e.g. window or door) to which an image of a product is to be applied/overlaid by the user application so as to be viewable on the user device's display as a simulation of the product in the user's environment. The user can do this by drawing, on a touchscreen of the user device, a diagonal line between opposite corners of the rectangular physical object (e.g. window or door) as viewed on the device's touchscreen. Using the AR features of the operating system, the application, at step 602, assigns the point at which the user's touch starts as the first corner of a rectangle and the point at which the user's touch ends as the second corner of the rectangle. Other methods of drawing a border around an object of interest in a 3D environment is envisaged—for example, by a user drawing a shape free-hand.

At step 603, the AR capability of the user's device calculates the height of the rectangle (by determining the vertical distance between the first corner and second corner) and the width of the rectangle (by determining the horizontal distance between the first corner and second corner). This rectangle defines an area to which an image of a product is to be applied, as will be described below. Alternatively, the height and width of the object to which a drawn shape is applied by be directly input by the user or fetched from memory upon the user's instruction.

At step 604, the rectangle is divided into a plurality of rows and columns to create a flat mesh. In one embodiment, the rectangle is assigned 10 columns and 100 rows. The number of rows and columns is variable and can be chosen depending on the particular implementation, and, more particularly, on the product type chosen. Each grid point of the flat mesh can be manipulated to deform the flat mesh (as each grid point will be assigned a texture (uv) coordinate). The more columns and/or rows (and therefore the number of grid points), the greater the flexibility and resolution of deformation (an example of which is shown in FIG. 6b). The user pre-selects a product type, as discussed above. Different product types include roman blinds, roller blinds and curtains). If, for example, the product type chosen is 'curtain', more columns than rows can be assigned to the flat mesh, because the folds of a curtain are vertical. Therefore a higher resolution of deformation in the x-z plane is advantageous to provide a more accurate simulation (as opposed to the y-z plane, relevant for a roman blind, for example, which has horizontal folds).

In one embodiment, the server stores an image of each product available to view via the user application. The server sends one or more images which match criteria specified by the user. The user device preferably receives these images at the start of the process, i.e. after product criteria has been input by the user. The images received by the user device may of a blind, shutter, curtain or other window or door treatment, as specified by the user or meeting search criteria (e.g. style, colour, pattern, etc). Images for each product stored at the server have a pre-determined width (for example, 200 cm for roman blinds, 150 cm for roller blinds etc). For each image, the number of pixels across the image's width and height are known. In a preferred embodiment, the application determines the number of pixels across a particular image's width automatically.

At step 605, the width and height of the product image is cropped to fit the area of the image container, whilst maintaining scale. As mentioned above, the number of pixels across the width and height of the product image is determined by the user application. For a specific product type, the image width (i.e. the physical width assigned to the stored image) is known. A texture width and height are calculated as follows:

Texture width of the product image=width in pixels of stored image/1000

Texture height of the product image=height in pixels of stored image/1000

The cropped width (U) of the product image is calculated as follows:

Cropped width (U) of the product image=width of rectangle/image width (1)

It will be appreciated that equation (1) provides a direct adjustment of the width of the product image based on the actual width of the window or door in the user's environment (using the width of the drawn rectangle as determined by the AR functionality of the user's device). The adjustment of the height of the product image based on the height of the actual height of the window or door (using the height of the drawn rectangle) is not direct, but instead is proportional according to the image width. This is to ensure that the product image does not completely fill the drawn rectangle (i.e. so that the product is not shown as completely occupying the area of the window or door), so that it appears that the blind (for example) is partly drawn up. The cropped height of the product image is therefore calculated as follows:

Cropped height (V) of the product image=height of rectangle/(texture height of the product image*(width of rectangle/texture width of the product image))

The result of step 605 is a cropped value of width (U) and a value of height (V) of the product image, based on the width and height of the rectangle drawn by the user. These cropped values of width and height (U and V) are used to apply the product image to the deformed rectangle (as described below).

At step 606, the centre of the width of the cropped product image is aligned with the centre of the (uncropped/original) product image. To do this, the (uncropped) product image is nominally assigned a width (U) value of 1. Using the cropped width (U) of the product image, a horizontal offset of the product image is calculated as follows:

Offset=0.5−(cropped width (U) of product image/width of product image)

At step 607, the product image is cropped (based on the calculated cropped width (U) and height (V) of the product image as calculated at step 605 and the horizontal offset calculated at step 606) and is applied to the mesh to result in an 2D image of a product as it would appear for the size of the user's window or door.

It will be appreciated that all blinds, shutters, or curtains have a depth (i.e. in a plane perpendicular to the plane defined by the area of the window or door). The extent of the depth will be dependent upon the type of product chosen. For example, roller blinds are generally made from a thin material and can be installed to hang very close to the window. The extent of deformation for a roller blind will be considerably less (and, in one embodiment, not deformed at all) compared to a roman blind, in which the blind material is folded as the blind is drawn up.

At step 608, each grid point of the flat mesh of the rectangle is assigned a number (an example of which is shown in FIG. 6*c*). The width spacing between the grid points is calculated by dividing the cropped width (U) of the product image (plus the horizontal offset) by the number of columns in the grid. The height spacing between grid points is calculated by dividing the cropped height (V) of the product image by the number of rows. The U coordinate of a grid point is determined by the column number divided by the number of columns and the V coordinate is determined by the row number divided by the number of rows.

At step 609, the rectangle mesh is deformed (according to the product type selected) to create a 3D model. The generated 3D model is specific to the size of the user's window or door and the chosen window or door treatment.

At step 610, the bottom row of 'empty' pixels is repeated for each pixel line occupying the determined empty space at the bottom of the image container, as determined by the proportional cropping of the height of the product image. At step 611, the user application places the 3D model (with the cropped product image applied) into the rectangle drawn by the user. This is achieved by translating and rotating the 3D model as follows:

$$yAngleRotation = -a\tan 2(firstCornerX - blindPositionX,$$
$$secondCornerZ - blindPositonZ) - \frac{\pi}{2}$$

where firstCornerX is the x coordinate of the first corner of the rectangle drawn by the user/AR functionality, secondCornerZ is the z coordinate of the second corner, diagonal to the first corner, of the rectangle drawn by the user/AR functionality.

Once the 3D model is positioned, the user drawn rectangle is hidden or removed.

It will be appreciated that the order of the steps above is variable.

Once the representation of the product is generated and is viewable in the user environment, the user is then invited to indicate whether they wish to see the price of the product according to the dimensions entered. Prices are fetched via an API call to an e-commerce platform which calculates a price according to the selections made by the user, including the width and length (in the embodiment where the application requires both the length or drop and width of the blind be entered at the start of the process). If the length was not entered by the user initially, the user will be prompted for the length/drop at this stage. Pricing information is sent to the application and the user is invited to either proceed with the purchase or can request a sample of the product (e.g. the material of the blind as per their selections). If the user wishes to proceed with purchase, they are invited to confirm the required dimensions of the product (e.g. the width and drop required for the blind) and may then be invited to make further product selections and alterations before proceeding through a checkout process as is known in the field.

It should be appreciated that the process described above could be applied to a bespoke product other than those explicitly mentioned.

The invention claimed is:

1. A method of simulating a product in a 3D environment, comprising the steps determining the dimensions of an object, wherein the dimensions define an image container;
receiving a product image, wherein the product image has predetermined dimensions;
calculating a width and/or height of the product image based on dimensions of the image container;
adjusting the width and/or height of the product image according to the calculated width and/or height to create an adjusted product image;
generating a 2D mesh using the image container;
deforming the 2D mesh according to a predetermined product type;
applying the adjusted product image to the deformed 2D mesh to create a 3D model of the product; and
placing the 3D model in a view of the 3D environment at the location of the object.

2. The method of claim 1, wherein the width and height of the adjusted product image are assigned UV values in UV space.

3. The method of claim 1, wherein the height of the adjusted product image is less than the height of the image container.

4. The method of claim 1, wherein the step of adjusting further comprises aligning the center of the width of the adjusted product image with the center of the product image so that the center width value of the product image is aligned with the center width value of the adjusted product image.

5. The method of claim 1, wherein the 2D mesh comprises a number of grid points, and wherein the number of grid points is dependent upon the type of product.

6. The method of claim 5, wherein the step of deforming the 2D mesh comprises moving the grid points in a direction perpendicular to the plane of the 2D mesh.

7. The method of claim 6, further comprising the step of assigning each grid point a UV coordinate, wherein the UV coordinates are determined based on the width value (U), and/or
height value (V) of the adjusted product image, the horizontal offset and the number of columns and rows in the 2D grid.

8. The method of claim 1 further comprising utilising augmented reality functionality to identify vertical planes in a 3D environment viewed through a camera feed of the device.

9. The method of claim 1, further comprising utilising augmented reality functionality to identify features of the 3D environment, preferably wherein the features are windows and doors.

10. The method of claim 9, further comprising receiving user input of the dimensions of the object in the 3D environment.

11. The method of claim 1, further comprising receiving user input specifying the object in the 3D environment.

12. The method of claim 1, wherein the object is a window or door.

13. The method of claim 1, wherein the predetermined product type comprises one of a roller blind, a roman blind and curtains.

14. A device comprising means for carrying out the method of claim 1.

15. A system for simulating an object in a 3D environment, wherein the system comprises a user device and an external computing system, wherein the user device is configured to:
    identify one or more features of an environment using an augmented reality framework determine the dimensions of a first object using the augmented reality framework receive user selection of a second object and a characteristic of the second object;
    send the received dimensions, second object and a characteristic of the second object to the external computing system; wherein the external computing system is configured to:
    store an image of a characteristic of the second object;
    adjust the image of the characteristic of the second object based on the received dimensions from the user device;
    map the adjusted image to a deformed mesh to create a customised 3D model, wherein the deformed mesh is associated with the second object, and
    send the customised 3D model to the user device.

16. A method of simulating a product in a 3D environment, comprising the steps determining the dimensions of an object located in a 3D environment;
    retrieving an image, wherein the image has predetermined dimensions;
    calculating an adjusted width and/or height of the image based on dimensions of the object;
    adjusting the width and/or height of the image according to the calculated width and/or height to create an adjusted image;
    generating a 2D mesh using the dimensions of the object;
    deforming the 2D mesh based on a received selection of a product;
    applying the adjusted image to the deformed 2D mesh to create a 3D model; and
    placing the 3D model in a view of the 3D environment at the location of the object.

* * * * *